Sept. 8, 1970  H. K. REIMSCHUESSEL ET AL  3,527,843
POLYLACTAM WITH POLYESTER WITH 0.005 TO 0.1 MOL OF
2,2-BIS(HYDROXYMETHYL) PROPIONIC ACID
PER MOL OF LACTAM
Filed April 11, 1968

INVENTORS:
HERBERT K. REIMSCHUESSEL
GERALD J. DEGE
BY
ATTORNEY

United States Patent Office 3,527,843
Patented Sept. 8, 1970

3,527,843
POLYLACTAM WITH POLYESTER WITH 0.005 TO 0.1 MOL OF 2,2-BIS(HYDROXYMETHYL) PROPIONIC ACID PER MOL OF LACTAM
Herbert K. Reimschuessel, Morristown, and Gerald J. Dege, Parsippany, N.J., assignors to Allied Chemical Corporation, New York, N.Y., a corporation of New York
Filed Apr. 11, 1968, Ser. No. 721,561
Int. Cl. C08g 41/04
U.S. Cl. 260—857
14 Claims

ABSTRACT OF THE DISCLOSURE

This specification discloses improved blends of polylactams and polyesters wherein the polylactam is modified by incorporating therein a minor amount of 2,2-bis(hydroxymethyl)propionic acid. These blends form films which show improved tear resistance and fibers which show improved resistance to splitting when compared to polylactam-polyester blends.

---

Figure 1:
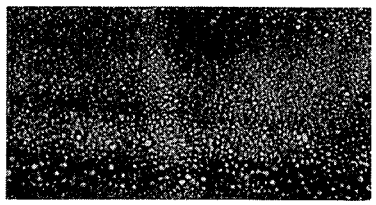
Figure 2:
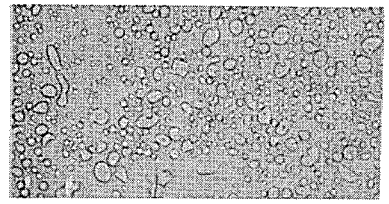
Figure 3:
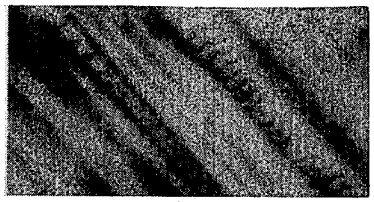
Figure 4:
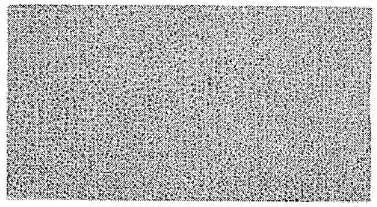

The excellent high strength properties of polylactams have long assured them of a substantial portion of the synthetic fiber and yarn markets for textiles, carpet yarn, tire cord, bristles and the like. However, polylactams have certain disadvantageous properties which have limited their applicability for certain applications. For example, nylon 6 has a lower tensile modulus than desired for resilient carpet yarn and for tire cord. It is known to admix polylactams with other polymers to improve or modify certain properties. Polyesters, such as polyethylene terephthalate, have been blended with polylactam to form compositions which have a higher tensile modulus than unmodified polylactam. However, these blends, which ideally are homogeneous dispersions of fine polyester particles in a polylactam matrix, are not stable to heat such as is encountered during processing. Upon exposure of the blends to elevated temperatures, the polyester particles agglomerate and settle out of the blend, forming a nonuniform dispersion. This nonuniformity leads to low tear strength of oriented films and fibrillation or splitting of monofilaments of the blend, resulting in low strength fibers. Further unprocessable gels, which interfere with extrusion and spinning operations, may form during exposure to elevated temperatures, probably due to interaction between reactive end groups of the polylactam and the polyester components.

Blends of polylactam and polyester have been stabilized to some extent by using an acid-terminated polylactam component; that is, a polylactam having an excess of carboxyl end groups over amine end groups. These polylactams can be prepared either by polymerizing a lactam in the presence of a monobasic or dibasic carboxylic acid, or by admixing a carboxylic acid with the polymerized lactam prior to blending. However, although use of an acid-terminated polylactam has improved the homogeneity of blends with polyesters, the heat stability of such blends is less than desired for applications such as the manufacture of tires.

It is a principal object of the present invention to provide polylactam-polyester compositions having improved stability to elevated temperatures.

It is another object to provide polylactam-polyester blends which can be formed into films having improved tear resistance.

It is a further object to provide polylactam-polyester blends which can be formed into fibers having improved resistance to fibrillation.

It is another object to provide a process for the preparation of polylactam films and fibers having improved properties.

Further objects will become apparent from the following detailed description thereof.

We have discovered that blends of a polyester and a polylactam containing a minor amount of 2,2-bis(hydroxymethyl)propionic acid, form uniform dispersions in the melt which are surprisingly stable when exposed to elevated temperatures. Blends of the invention can be heated to temperatures above the melting point for periods of up to one hour and longer without substantial agglomeration of the polyester component or gel formation. Films formed from the blends of the invention have improved tear resistance over conventional blends and fibers formed from the blends of the invention have improved resistance to fibrillation or splitting.

The invention may be better understood by referring to the drawings. FIGS. I and II are photomicrographs of a film formed from a conventional blend of a sebacic acid terminated polycaprolactam and polyethylene terephthalate before and after heating above the melting point. FIGS. III and IV are photomicrographs of a film formed from a blend of the invention before and after heating above the melting point.

According to the present invention, a modified polylactam prepared by adding 2,2-bis(hydroxymethyl)propionic acid to a lactam and polymerizing the lactam is blended with a polyester. The modified polylactam can be the principal polylactam component of the blend or can be added in addition to a conventionally prepared polylactam. At least about 0.005 mol of 2,2-bis(hydroxymethyl) propionic acid will be present for each mol of lactam in the blend in order to obtain the desired improvement. Since the molecular weight of the polylactam decreases as the amount of 2,2-bis(hydroxymethyl)propionic acid present increases, amounts up to about 0.04 mol of 2,2-bis(hydroxymethyl)propionic acid per mol of lactam are generally employed for the preparation of blends suitable for the formation of fibers directly. However, larger amounts, up to about 0.1 mol of 2,2-bis(hydroxymethyl) propionic acid per mol of lactam can be employed, particularly when the modified polylactam is admixed with a higher molecular weight polylactam in the blend.

Most surprisingly, the tear resistance of films formed from the blends of the invention can be improved by heating the blends at temperatures above the melt for short periods of time, i.e. up to two hours, or until the reduced viscosity of the polylactam decreases substantially from its original value. Thus, according to the preferred process of the invention, the blends containing the polylactams modified in accordance with the invention may be heated for a minute or longer prior to forming into films and fibers.

Lactams suitable for use in the invention are lactams having from 7 to 12 atoms in the ring and include ε-caprolactam, caprylactam, oenantholactam and laurolactam. Mixtures of lactams can also be employed. ε-caprolactam is particularly preferred.

The lactams are polymerized hydrolytically by well known methods, as by heating to a suitable temperature, which for ε-caprolactam is generally from about 225° C. to about 280° C. and preferably from about 240° C. to about 250° C., under an inert atmosphere in the presence of a catalyst. Suitable catalysts are well known and include steam, water, ε-aminocaproic acid and the like. The polymerization is continued until the desired molecular weight is obtained. This can be determined by measuring reduced viscosity which can vary from about 0.5 to about 4.0. Molecular weights corresponding to reduced viscosities on the order of at least 1.0 are generally required for the fabrication of fibers. An additional requirement for the fabrication of fibers is a melt viscosity on the order of from 10 to 70 grams of polymer extruded in 10 minutes at 260° C. with an applied weight of 2160 grams, as measured according to ASTM Test D-1238-62T, for optimum extrudability and fiber properties.

The polyesters useful in the blends of the invention are prepared by condensing a dicarboxylic acid or the lower alkyl ester, acid halide, or anhydride derivatives thereof with a glycol, according to methods well known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxyphenoacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p'-dicarboxydiphenylpropane, p,p' - dicarboxydiphenyloctane, 3-alkyl-4-($\beta$-carboxyethoxy)-benzoic acid, 2,6-naphthalene dicarboxylic acid, 2,7-naphthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinol, or alkyl-substituted derivatives of these compounds.

The blends of the invention comprise a mixture containing from about 10% to about 50% by weight of polyester in a modified polylactam matrix. Preferably the blends will contain from about 20% to about 40% by weight of polyester to obtain optimum improvement in the properties of the modified polylactams.

The blends can be prepared by admixing the desired proportion of the polymers as described above at a temperature from the melting point of the higher melting component to about 350° C. The polylactam and the polyester can be blended dry before melting or the entire mixing step can be carried out conveniently by stirring or extrusion in the melt. Blending is preferably carried out in a dry, inert atmosphere, since it is desirable to have a low moisture content in the blend and to prevent degradation reactions of the polylactam.

Alternatively the blends can be prepared in solution by dissolving the polylactam and the polyester in a common solvent and precipitating a mixture of the polymers either by evaporating the solvent or by adding a nonsolvent to the solution.

The blends can be formed into films, molded articles or monofilaments and drawn into fibers by the well-known techniques used for polylactams. Typically the blends are melted, mixed and formed in a single step process in an extruder.

The invention will be further illustrated by the following examples, but it is to be understood that the invention is not meant to be limited to the details disclosed therein. In the examples all parts are by weight unless otherwise noted.

Reduced viscosity was determined from a 0.5% by weight solution of the polymer in a solvent, generally m-cresol, at 25° C.

15 mil films were prepared by compression molding at 240° C.–265° C. for five (5) minutes followed by quick quenching. Tensile properties were determined according to ASTM Test D1708 and tear resistance according to ASTM Test D1004–66.

EXAMPLES 1–5

Preparation of modified nylons

Various amounts of 2,2-bis(hydroxymethyl) propionic acid, as specified below, were added to portions of 22.6 parts each of $\epsilon$-caprolactam. 0.46 part of water was added to each portion and the mixtures polymerized by heating at 190° C. for 20 minutes and at 260° C. for about 18.5 hours under an inert atmosphere.

The resultant hard, white polymers were extracted with boiling water to remove unreacted monomer and low molecular weight material and dried.

The reduced viscosity, carboxyl end group and amine end group analyses, expressed as milliequivalents per gram, (hereinafter designated meq./g.) of the polymers are summarized in Table I below.

TABLE I

| Example | Mols 2,2-bis-hydroxymethl) propionic acid added per mole of caprolactam | Reduced viscosity | Carboxyl end groups, meq./g. | Amine end groups, meq./g. |
| --- | --- | --- | --- | --- |
| 1 | 0.0100 | 1.80 | 0.040 | 0.032 |
| 2 | 0.0133 | 1.31 | 0.071 | 0.030 |
| 3 | 0.0200 | 1.21 | 0.084 | 0.030 |
| 4 | 0.0400 | 0.96 | 0.110 | 0.043 |
| 5 | 0.0800 | 0.50 | 0.170 | 0.051 |

The data shows that as increasing amounts of 2,2-bis (hydroxymethyl) propionic acid are added to the lactam, the carboxyl end group concentration increases and the reduced viscosity of the resultant polymer decreases.

EXAMPLE 6

Blends of the polyamides prepared according to Examples 1–4, numbered 1 to 4 respectively, were prepared by admixing 70 parts of the polyamide with 30 parts of a polyethylene terephthalate having a reduced viscosity of 0.60 in an extruder at 280–285° C. A blend numbered 5 was prepared by adding 30 parts of a blend containing 9 parts of the polyethylene terephthalate and one part of the modified polyamide prepared according to Example 5 to 70 parts of a conventional acid terminated polycaprolactam. This polycaprolactam had a reduced viscosity of 1.32 and was prepared by polymerizing $\epsilon$-caprolactam following the procedure given in Examples 1–4 in the presence of 0.01 mol of sebacic acid per mol of $\epsilon$-caprolactam. The conventional polycaprolactam had an amine end group concentration of 0.024 meq./g. and a carboxyl end group concentration of 0.097 meq./g.

The blends were molded into 20 mol films and oriented by drawing at 150° C. to a draw ratio of 4:1. Test specimens were cut from the films in the directions both parallel to and perpendicular to the draw direction. Tensile properties and tear resistance were determined for the blends. The data are summarized in Table II below. The control was a blend containing 70 parts of the sebacic acid terminated nylon and 30 parts of the polyethylene terephthalate.

TABLE II

| Composition | Ultimate tensile strength, p.s.i. | Ultimate elongation, percent | Tear resistance, grams |
| --- | --- | --- | --- |
| Parallel to draw direction | | | |
| Blend 1 | 34,600 | 48.0 | 4500 |
| Blend 2 | 32,640 | 48.2 | 5070 |
| Blend 3 | 31,350 | 33.2 | 3890 |
| Blend 4 | 26,750 | 33.2 | 2670 |
| Blend 5 | 35,300 | 45.9 | 2970 |
| Control | 34,400 | 49.0 | 2100 |
| Perpendicular to draw direction | | | |
| Blend 1 | 6,000 | 4.8 | 920 |
| Blend 2 | 4,160 | 5.9 | 880 |
| Blend 3 | 3,830 | 5.7 | 220 |
| Blend 4 | 3,890 | 4.0 | 60 |
| Blend 5 | 5,480 | 10.3 | 1080 |
| Control | 5,600 | 4.3 | 540 |

Thus blends of the invention show improved tear resistance with little change in tensile properties over conventional polylactam-polyester blends.

The heat stability and dispersion of blend 2 was compared to the control blend by examining unoriented films under a microscope. Small pieces of each film were imbedded in a methyl- and butylmethacrylate resin and microtomed to 3–4 microns thickness. The sections were stained by immersing them in 0.1% solution of Brilliant Acid Blue dye at 90° C. for 45 minutes. The polylactam component of the blend was stained blue whereas the polyester remained unstained. The sections were rinsed with water, dried thoroughly and placed between glass plates on a hot stage microscope preheated at 280° C. Photographs (140×) of the films were made immediately. FIG. 1 depicts the control blend and FIG. III depicts the blend 2 film. The polycaprolactam component is the matrix in both cases. It is apparent that the initial dispersion of the polyester particles in both films is quite uniform. The polyester particles have a fine particle size ranging from about 0.7 to about 2 microns. The films were then heated for five minutes at 280° C. and additional photographs taken, shown at FIG. II and IV respectively. The photograph of the control blend after heating, shows that the polyester particles agglomerated forming large particles of polyester nonuniformly dispersed in the polylactam matrix. FIG. IV shows the blend 2 film on the other hand after heating, remained as a uniform dispersion of fine particles of polyester in the polylactam matrix.

EXAMPLE 7

70 parts of a polylactam prepared by polymerizing ε-caprolactam in the presence of 1% of water and 1.33% by weight of the caprolactam of 2,2-bis(hydroxymethyl) propionic acid, having a reduced viscosity of 1.69, a carboxyl end group concentration of 0.035 meq./g. and an amine end group concentration of 0.035 meq./g. was blended with 30 parts of polyethylene terephthalate having a reduced viscosity of 0.61, a carboxyl end group concentration of 0.07 meq./g. and a hydroxyl end group concentration of 0.07 meq./g. in an extruder at 275–280° C.

Portions of the blend were heated at 280° C. for periods ranging from 0.25 to 4 hours. Films were prepared as in Example 6. Tensile and tear resistance data are summarized in Table III below.

TABLE III

| Heating time, hours | Ultimate tensile strength, p.s.i. | Ultimate elongation, percent | Tear resistance, grams |
| --- | --- | --- | --- |
| Parallel to draw direction | | | |
| 0.25 | 29,530 | 40.0 | 4,710 |
| 0.5 | 28,630 | 40.0 | 4,940 |
| 1.0 | 30,810 | 40.0 | 4,900 |
| 2.0 | 24,950 | 30.0 | 4,130 |
| Perpendicular to draw direction | | | |
| 0.25 | 4,510 | 6.9 | 1,300 |
| 0.5 | 4,830 | 5.0 | 1,610 |
| 1.0 | 4,760 | 5.3 | 1,870 |
| 2.0 | 5,290 | 4.6 | 1,670 |

The tear resistance of these films is higher than that of conventional blends, as shown in the data in Table II.

The reduced viscosity and the melting points of the blend components, determined as the point at which birefringence on a hot stage polarizing microscope disappears, decreases as heating above the melting point continues. Data is summarized in Table IV.

TABLE IV

| Heating time, hours | Reduced Viscosity | Melting point Polylactam, °C. | Melting point Polyester, °C. |
| --- | --- | --- | --- |
| 0.25 | 1.38 | 220.0 | 253.3 |
| 0.50 | 1.27 | 219.5 | 252.5 |
| 1.0 | 1.10 | 217.0 | 250.8 |
| 2.0 | 0.78 | 212.0 | 248.0 |
| 4.0 | 0.41 | 190.0 | 239.0 |

Examination of the blend under a microscope showed that the blend remained as a fine dispersion of the two components for at least one hour. The blend heated for two hours did show some agglomeration of polyester, probably due to the decreasing viscosity of the polyamide component.

It will be apparent that numerous modifications and variations may be effected without departing from the novel concepts of the present invention, and the illustrative details disclosed are not to be construed as imposing undue limitations on the invention.

We claim:

1. A composition comprising a blend of from about 50 percent to about 90 percent by weight of a polylactam prepared from a lactam having from 7 to 12 atoms in the ring, and from about 10 percent to about 50 percent by weight of a fiber forming polyester prepared from condensing a dicarboxylic acid or its derivatives with a glycol and which contains from about 0.005 to about 0.1 mol of 2,2-bis(hydroxymethyl) propionic acid per mol of lactam.

2. A fiber formed from the composition of claim 1.

3. A film formed from the composition of claim 1.

4. A composition comprising a blend of from about 50 percent to about 90 percent by weight of a modified polylactam prepared by polymerizing a lactam having from 7 to 12 atoms in the ring in the presence of from about 0.005 to about 0.1 mol of 2,2-bis(hydroxymethyl) propionic acid per mol of lactam and from about 10 percent to about 50 percent by weight of a fiber forming polyester prepared from condensing a dicarboxylic acid or its derivatives with a glycol.

5. A composition according to claim 4 wherein said lactam is ε-caprolactam.

6. A composition according to claim 4 wherein said polyester is polyethylene terephthalate.

7. A composition according to claim 4 wherein said modified polylactam is derived from ε-caprolactam polymerized in the presence of from about 0.01 to about 0.04 mol of 2,2-bis(hydroxymethyl) propionic acid per mol of ε-caprolactam.

8. A composition according to claim 7 wherein said polyester is polyethylene terephthalate.

9. A film formed from the composition of claim 8.

10. A fiber formed from the composition of claim 8.

11. A process for preparing films from blends of a polyamide and a polyester having improved tear resistance which comprises blending from about 50 percent to about 90 percent by weight of a modified polylactam prepared by polymerizing a lactam having from 7 to 12 atoms in the ring in the presence of from about 0.005 to about 0.1 mol of 2,2-bis(hydroxymethyl) propionic acid per mol of lactam with a fiber forming polyester prepared from condensing a dicarboxylic acid or its derivatives with a glycol, heating the blend for at least 1 minute and up to 2 hours at a temperature above the melting point from forming a film therefrom.

12. A process according to claim 10 wherein said lactam is ε-caprolactam and said polyester is polyethylene terephthalate.

13. A process for preparing fibers from blends of a polyamide and a polyester having improved resistance to splitting which comprises blending from about 50 percent to about 90 percent by weight of a modified polylactam prepared by polymerizing a lactam having from 7 to 12 atoms in the ring in the presence of from about 0.005 to about 0.1 mol of 2,2-bis(hydroxymethyl) propionic acid per mol of lactam with a fiber forming polyester prepared from condensing a dicarboxylic acid or its derivatives with a glycol, heating the blend for at least 1 minute and up to 2 hours at a temperature above the melting point and forming a fiber therefrom.

14. A process according to claim 13 wherein said lactam is ε-caprolactam and said polyester is polyethylene terephthalate.

(References on following page)

References Cited

UNITED STATES PATENTS

| | | | |
|---|---|---|---|
| 3,369,057 | 2/1968 | Twilley | 260—857 |
| 3,378,055 | 4/1968 | Robertson | 260—857 |
| 3,378,056 | 4/1968 | Robertson | 260—857 |
| 3,378,602 | 4/1968 | Robertson | 260—857 |
| 3,382,305 | 5/1968 | Breen | 260—857 |
| 3,386,967 | 6/1968 | Twilley | 260—857 |
| 3,441,953 | 4/1969 | Dumont | 117—139.5 |
| 3,468,975 | 9/1969 | Duxbury | 260—857 |
| 3,470,686 | 10/1969 | Fleming | 260—857 |

PAUL LIEBERMAN, Primary Examiner

U.S. Cl. X.R.

260—78, 45.85, 45.95